United States Patent

Schaeffer

[15] 3,640,615

[45] Feb. 8, 1972

[54] XEROGRAPHIC REPRODUCING APPARATUS

[72] Inventor: Robert A. Schaeffer, Rochester, N.Y.

[73] Assignee: Xerox Corporation, Rochester, N.Y.

[22] Filed: Nov. 14, 1967

[21] Appl. No.: 682,830

[52] U.S. Cl. ....................355/8

[51] Int. Cl. ....................G03g 15/04

[58] Field of Search ....................355/8, 49; 95/4, 5, 15

[56] References Cited

UNITED STATES PATENTS

| | | | |
|---|---|---|---|
| 1,987,064 | 1/1935 | Hopkins | 355/49 X |
| 2,487,671 | 11/1949 | Pratt | 95/15 X |
| 3,234,865 | 2/1966 | Scott | 95/12.5 |
| 3,432,231 | 3/1969 | Gardner | 355/11 X |
| 2,261,538 | 11/1941 | Brand | 95/4.5 |

*Primary Examiner*—John M. Horan
*Attorney*—Frank A. Steinhilper, Ronald Zibelli and James J. Ralabate

[57] ABSTRACT

An automatic xerographic reproducing apparatus for reproducing and standardizing computer printout including an optical scanning system adapted to selectively vary the length and speed of scan in response to the size of the original document to create a standardized output format by reproducing an original document or creating a facsimile thereof.

12 Claims, 7 Drawing Figures

PATENTED FEB 8 1972

3,640,615

SHEET 1 OF 5

INVENTOR.
ROBERT A. SCHAEFFER
BY
Ronald Zibelli
ATTORNEYS

INVENTOR.
ROBERT A. SCHAEFFER
BY August E. Roehrig Jr.
Ronald Zibelli
ATTORNEYS

XEROGRAPHIC REPRODUCING APPARATUS

BACKGROUND OF THE INVENTION

This invention relates to xerographic reproducing machines and, in particular, to an automatic xerographic reproducing machine adapted to reproduce various sized documents on a photoreceptive surface.

More specifically, this invention relates to an automatic xerographic reproducing machine adapted to selectively vary the scanning of an original document in accordance with the document size.

In utilizing electronic data processing equipment and especially electronic computing apparatus, much time and expense is minimized by the equipment's ability to perform functions which provide information in a fractional time as compared with that required prior to the development of such equipment. However, much of the time and expense saved by this equipment is lost due to the instability of disseminating the information obtained from this equipment to but one or a few persons immediately after this information has been generated. Various printing devices have been developed for creating a permanent copy of the information obtained from electronic data processing equipment, but this equipment has been limited to creating a single or a very few multiple copies by carbon interleaving. In addition, this printout which is generated by the electronic data processing (EDP) equipment is of various sizes and in fanfold form, that is the leading edge of one sheet is separably attached to the trailing edge of the preceding sheet, which is bulky and difficult to manually handle. The need for many multiple copies of the EDP equipment printout in a convenient form to enable the user to evaluate this data and to facilitate its storage for subsequent use has created an information "bottleneck" which precludes the utilization of the data processing equipment at its maximum efficiency and effectiveness. The invention of this application provides a rapid automatic means of creating multiple copies of such information in a convenient standardized format.

SUMMARY OF THE INVENTION

It is, therefore, an object of this invention to improve utilization of electronic data processing equipment output.

Another object of this invention is to reproduce electronic data processing equipment printout in a standardized format for ease and convenience of the user.

A further object of this invention is to improve automatic xerographic reproducing machines to generate multiple copies of standardized computer printout.

Still another object of this invention is to improve automatic xerographic reproducing machines to selectively vary the scanning of an original document in accordance with the document length.

These and other objects are attained in accordance with the present invention wherein there is provided an automatic xerographic reproducing machine including an optical scanning system adapted to be selectively actuated for duplicating electronic data processing equipment printout and creating a reduced facsimile of such printout in a standardized format.

DESCRIPTION OF DRAWINGS

Further objects of this invention, together with additional features contributing thereto and advantages accruing therefrom, will be apparent from the following description of one embodiment of the invention when read in conjunction with the accompanying drawings, wherein.

DESCRIPTION OF THE PREFERRED EMBODIMENT

Figure 1:
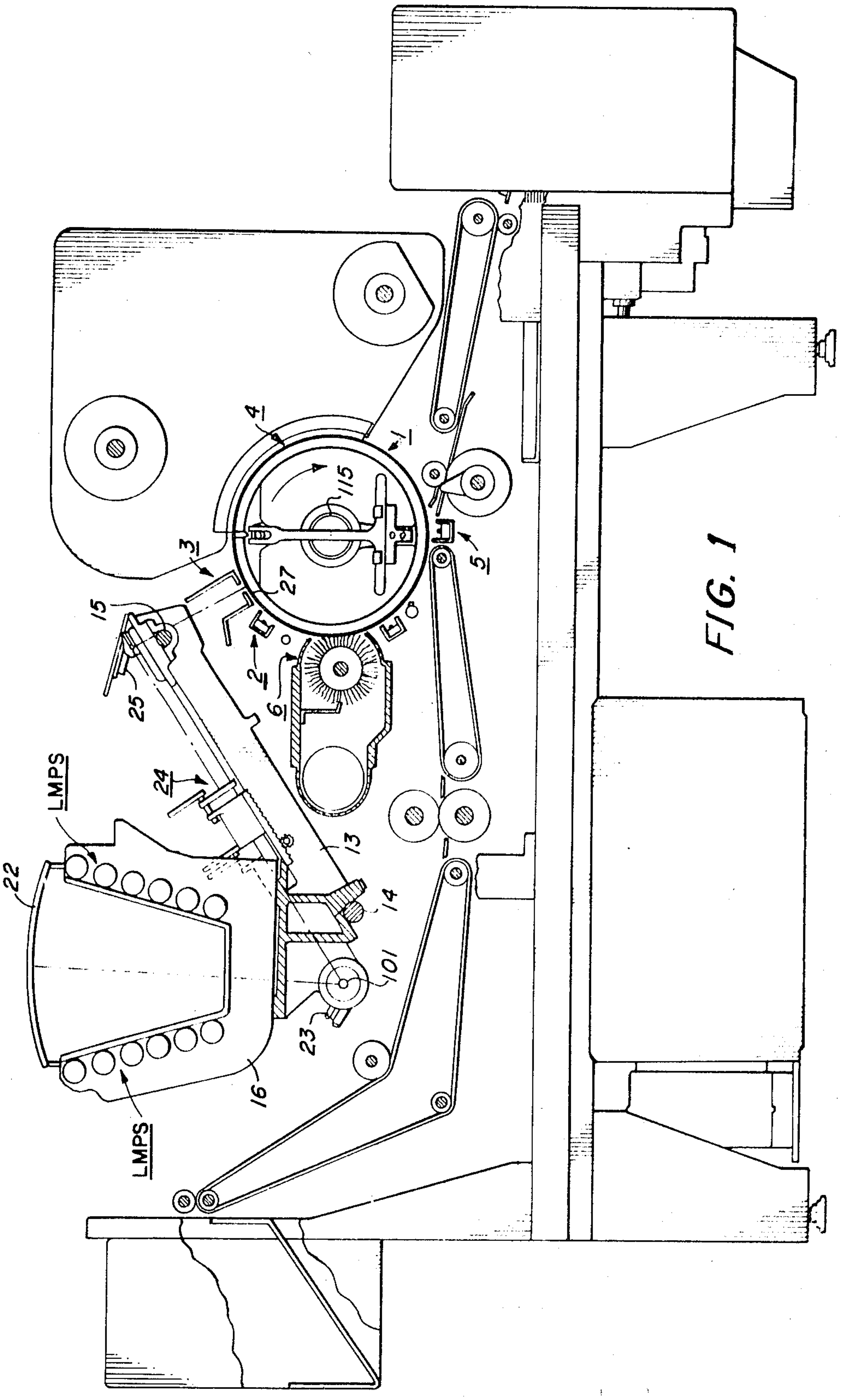
FIG. 1 is a schematic representation of an automatic xerographic reproducing machine utilizing the invention of this application.

Referring now to the drawings, there is shown in FIG. 1 an embodiment of the subject invention in a suitable environment such as an automatic xerographic reproducing machine, although it should be noted that the invention is not intended to be limited thereto.

The automatic xerographic reproducing machine includes a xerographic plate 1 having a photoconductive layer or light-receiving surface on a conductive backing, journaled in a frame to rotate in the direction indicated by the arrow to cause the plate surface to sequentially pass a series of xerographic processing stations. For the purpose of the present disclosure, the several xerographic processing stations in the path of movement of the plate surface may be described functionally, as follows:

A charging station 2 at which a uniform electrostatic charge is deposited on or in the photoconductive plate;

An exposure station 3 at which a light or radiation pattern of copy to be reproduced in projected onto the plate surface to dissipate the charge in the exposed areas thereof to thereby form a latent electrostatic image of the copy to be reproduced;

A developing station 4 at which xerographic developing material, including toner particles having an electrostatic charge opposite to that of the latent electrostatic image, is cascaded over the plate surface whereby the toner particles adhere to the latent electrostatic image to form a toner-powder image in configuration of the copy being reproduced;

A transfer station 5 at which the toner-powder image is electrostatically transferred from the plate surface to a transfer material or a support surface; and A drum cleaning and discharge station 6 at which the plate surface is brushed to remove residual toner particles remaining thereon after image transfer, and exposed to a relatively bright light source to effect substantially complete discharge of any residual electrostatic charge remaining thereon or therein.

Figure 2:
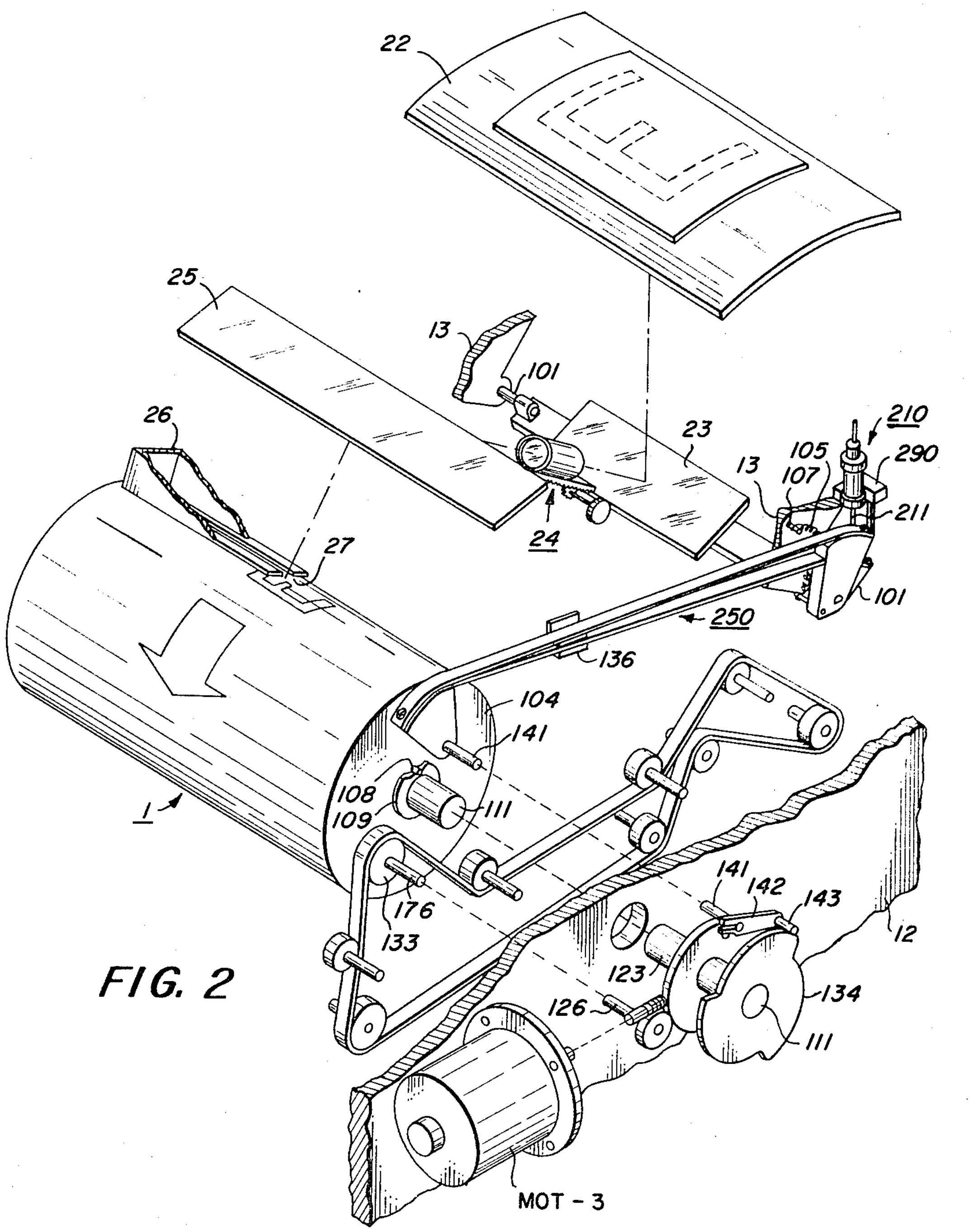
FIG. 2 is a perspective view of the optical system of the invention and the drive system for the various cooperative elements associated with the xerographic drum.
Figure 3:
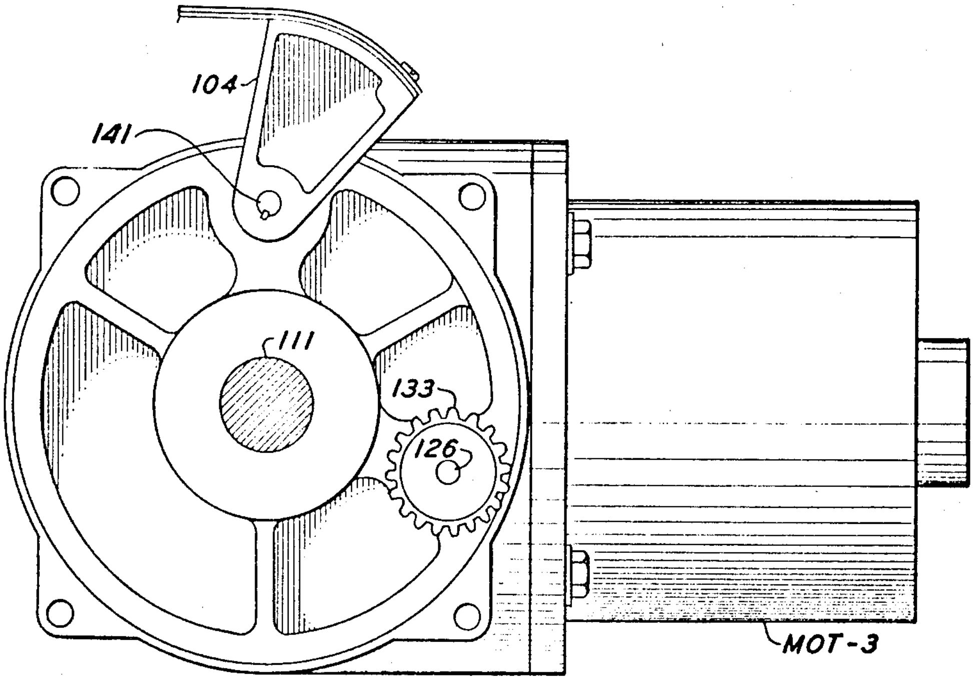
FIG. 3 is a rear view of the drum drive mechanism to show the arrangement of the various drive elements used in synchronizing the improved optical scanning system.
Figure 4:
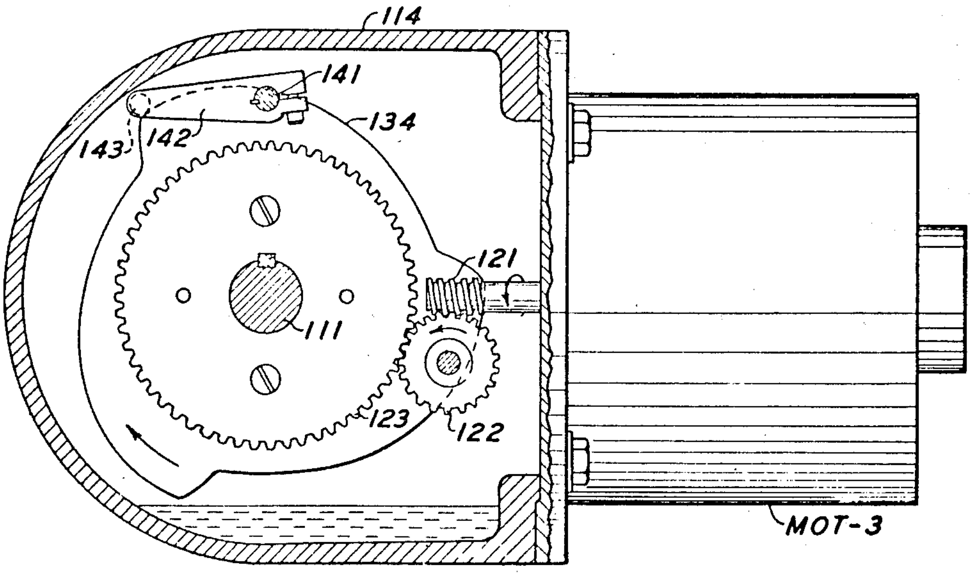
FIG. 4 is a rear view of the apparatus of FIG. 3 with the rear cover broken away to better illustrate the internal components.
Figure 5:
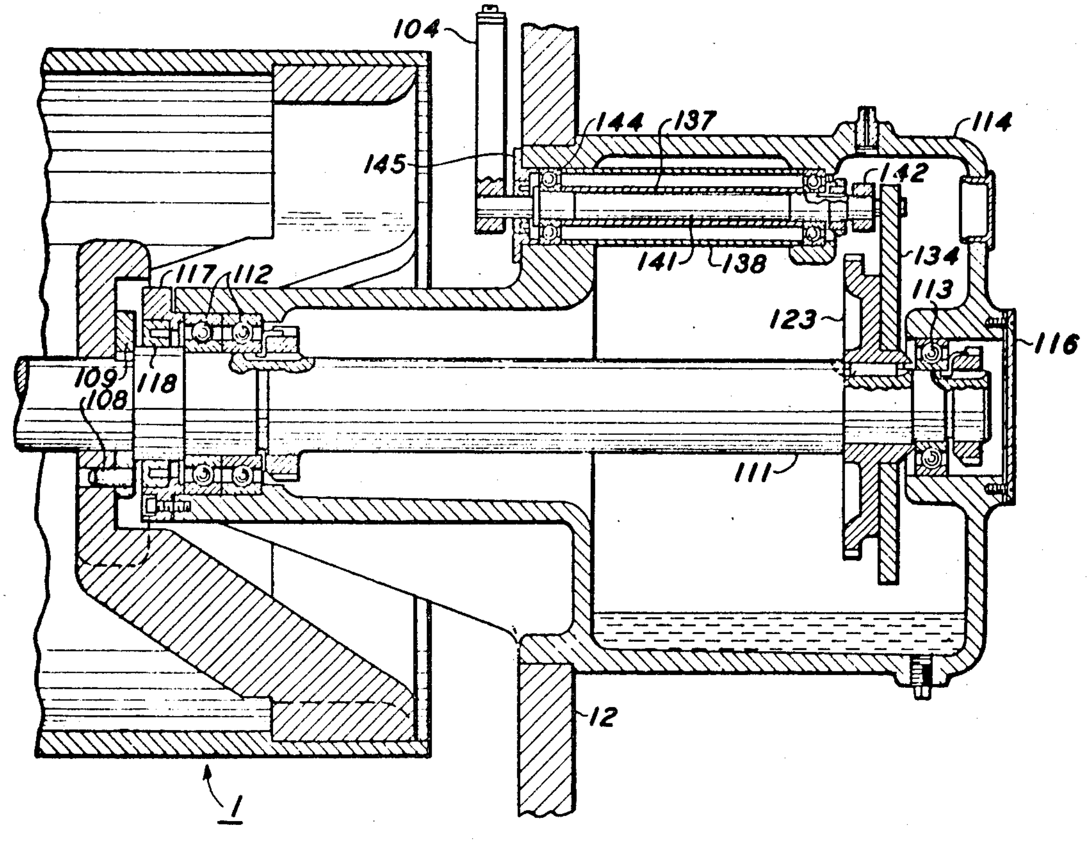
FIG. 5 is a sectional view of the drum drive mechanism to better illustrate the synchronization of the scanning system with the xerographic drum.
Figure 7:
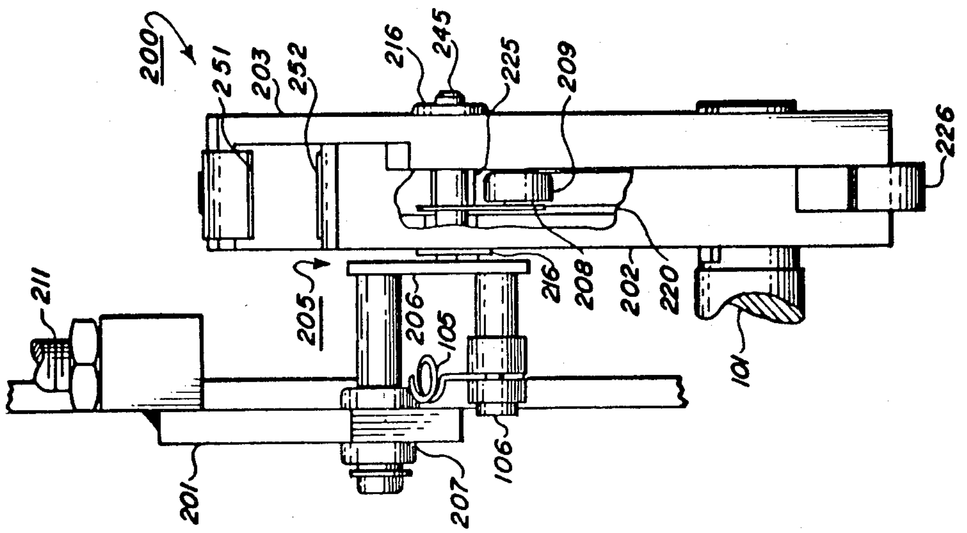
FIG. 7 is an end view of the apparatus of FIG. 6.

It is felt that the preceding description of the xerographic process is sufficient for a better understanding of this invention. Referring again to FIG. 1, a xerographic drum is rotated and an incremental area of a document on a platen is scanned at a rate such that the optical image is projected at a predetermined rate relative to the rotation of the xerographic drum. The optical scanning or projection system disclosed herein projects a flowing image onto the surface of the photoconductive drum from a stationary original. The optical scanning or projection assembly comprises a stationary copy board which includes a transparent curved platen member 22 such as, for example, a glass plate or the like positioned on the exterior of the machine and adapted to support a document to be reproduced, the document being uniformly illuminated and arranged in light projection relation to the moving light-receiving surface of the xerographic drum. Uniform lighting is provided by banks of lamps LMPS arranged on opposite sides of the copy board. Scanning of the document on the stationary copy board is accomplished by means of a mirror assembly which is oscillated relative to the copy board in timed relation to the movement of the xerographic drum. The mirror assembly, which includes an object mirror 23, is mounted below the copy holder to reflect an image of the document through a lens unit 24 onto an image mirror 25 which, in turn, reflects the image onto the xerographic drum through a slot in the fixed light shield 26 positioned adjacent to the xerographic drum surface. In the embodiment of the invention shown, the scanning of electrical accounting machine printout is accomplished by placing the original copy of the copy holder and scanning the document by means of oscillating the object mirror through a lens onto an image mirror which, in turn, reflects the image through a slotted light shield onto the xerographic drum. The exposure mechanism includes an optical frame 13 for supporting the object mirror, lens and image mirror. The optical frame 13 is supported at one end by a support bar 14 appropriately secured to and extending laterally between the machine frames (one of which is partially shown in FIG. 2) and at the opposite end by pin support 15 secured to frame 12. Attached to the optical frame, adjacent to the object mirror, is a lamp holder frame assembly 16 which in turn, supports the platen 22.

The platen 22, made of transparent material such as glass, is suitably supported by the lamp holder frame assembly directly over the axis of rotation of the object mirror 23. Platen 22 is curved in the shape of an arc, with the radius thereof equal to the distance from the platen surface to the axis of rotation of the object mirror 23.

The printout from the electronic data processing machine to be reproduced is placed on the curved platen 22, for example, by means of the apparatus disclosed in copending application, Ser. No. 607,004, filed Jan. 3, 1967, in the name of A. M. Hitchcock et al., although manual placement is also possible, and uniformly illuminated by banks of lights such as fluorescent lamps LMPS mounted in conventional fluorescent lamp holder secured to the lamp holder frame assembly 16.

Object mirror 23 is supported by a suitable mirror support assembly fixed to a mirror shaft 101 journaled by suitable bearings mounted in optical frame 13. A detailed description of the mirror support assembly is not deemed pertinent to a complete understanding of the invention of this application, it being noted that this assembly positions the mirror in a flattened portion of the shaft so that the reflecting surface of the mirror is in a plane extending through the axis of shaft 101.

Oscillation of shaft 101, and therefore the scanning or object mirror 23, is governed by a controller 200 hereinafter described in detail. Motion which is one direction, during scanning, is effected by means of drive system 250 comprising steel tapes 251 and 252 secured at one end to a portion of the controller 200 and at the other end to an arm 104 driven in synchronization with the rotation of the xerographic drum, as described in detail hereinafter. The mirror is then returned to its start-of-scan position by means of a spring 105 connected at one end to a pin 106 fixed to the controller and at its other end to a pin 107 secured in the optical frame 13 to normally bias the mirror into the start-of-scan position.

The image mirror 25 is secured in a suitable manner in a fixed position on the optical frame 13 in the optical path from object mirror 23. The light shield 26 comprises an open, elongated box having sidewalls, end walls and a bottom wall provided with a narrow aperture 27 extending across the length of the light shield. Light shield 26 is secured to the optical frame and is positioned with its bottom wall adjacent to the peripheral surface of the drum and with the centerline of the aperture parallel to the drum axis of rotation.

The xerographic plate or drum 1 is mounted on horizontal driven shaft 111 that rotates in bearings 112 and 113 positioned in drum drive casing 114 secured to the outer face of inboard frame 12 with a portion of the drum drive casing extending through a suitable opening in the frame 12 toward a similar frame supported parallel thereto on the opposite or outboard side. The free end or outboard end of shaft 111 is threaded to receive a thumb nut 115 to secure the inboard hub to the xerographic drum and into driven engagement with the pin 108 of drive collar 109 secured to the shaft for rotation therewith. The openings in the drum drive casing to receive the shaft 111 are closed at one by cover 116 and at the opposite end by bearing-retaining cap 117 supporting seal 118 encircling the shaft.

The shaft 111 is operatively connected to the main drive motor MOT–3 of the automatic xerographic reproducing machine by worm gear 121 suitably secured to the end of the motor shaft and engaging gear 122 which, in turn, drives gear 123 suitably secured to shaft 111. The gear 123 is maintained in axial alignment thereon by means of a washer and bearing threaded onto the end of the shaft and biased into contact with bearing 113 abutting one side of the hub of gear 123, with the opposite of the gear being positioned against a shoulder formed on shaft 111.

Gear 122 is fixed to one end of shaft 126 journaled in suitable bearings mounted in the drum drive casing. The opposite end of shaft 126 extends from the drum drive casing through a seal and bearing-retaining cap beyond the output face of the inboard frame 12 and has fixed at the end thereof a sprocket 133 to drive a suitable timing belt to power various mechanisms of the machine.

To effect a scanning cycle of the object mirror 23, there is fixed to the gear 123 on drum shaft 111 a cam 134 having three cam lobes. The arm 104, secured to shaft 141, has one end of the drive tapes 251 and 252 secured thereto. The tapes extend over tape guide 136 fixed to frame 12 and are secured at their opposite end to the scanning mirror actuating controller 200 fixed to one end of shaft 101. The opposite end of shaft 141 is provided with a cam follower arm 142, secured thereto which carries a cam follower 143 adapted to engage cam 134. Shaft 141 is journaled by bearing 144 mounted in the drum drive housing in spaced relation by cylindrical spacers 137 and 138 and secured therein by a seal bearing retaining cap 145 provided with an appropriate seal, washer and retaining nut.

With this arrangement, the object mirror is oscillated three times to scan an image during each revolution of the drum and synchronization with the rotation thereof, since it is driven during this scanning cycle directly from the drum shaft as the cam follower 143 follows the rise portion on cam 134 secured to the drum shaft. Return motion of the mirror to its start-of-scan position is effected by the biasing action of spring 105 and this return motion is effected rapidly because of the shape of the fall portion of the cam lobe of cam 134, it being apparent that spring 105 will always bias cam follower 143 into cooperative engagement with cam 134.

The length of the scanning arc of mirror 23 and the scan speed is governed by the drive system 250 and more specifically the activation of one of the drive tapes 251 or 252 to synchronously oscillate the scanning mirror 23 with the rotation of the xerographic drum 1. A pneumatic cylinder 210 of any well-known type in which the plunger 211 may be activated to at least two physically discrete positions, or a suitable electrically actuated solenoid, is secured to the optical frame 13 by an appropriate bracket 290 in a position whereby a clevislike bracket 201 secured to the end of the plunger engages a roller bearing 207 rotatably mounted on one end of a bellcrank arm 206 pivotally supported in frame 202 of the controller 200.

Figure 6:
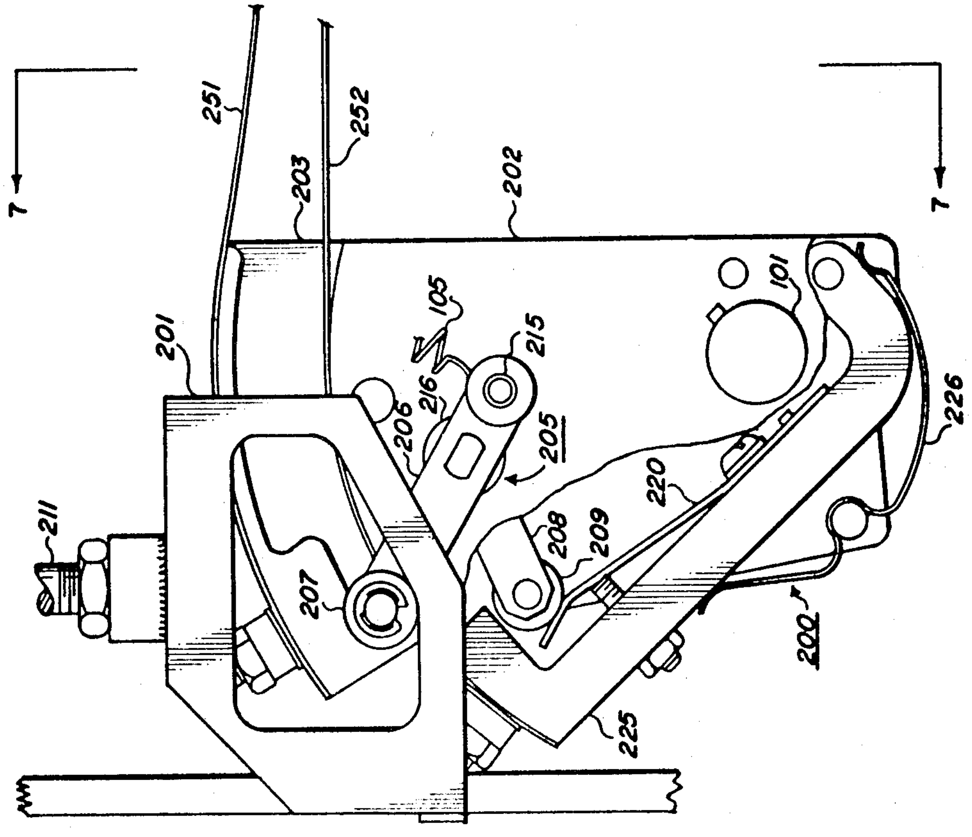
FIG. 6 is an enlarged view of the apparatus for selectively actuating the drive mechanism for altering the scanning length and speed in relationship to the original document.

Activation of the pneumatic cylinder 210 raises the clevislike bracket 201 to the upper of the two physically discrete positions, pivoting the bellcrank 205 about its center thereby rotating actuator arm 208, secured thereto, in a clockwise direction as seen in FIG. 6. The actuator arm 208 is secured to shaft 215 of the bellcrank and rotatable therewith in a suitable bearing 216 secured at one end in frame plate 202 of the controller 200.

Upon rotation of actuator arm 208 a roller 209 secured to the end thereof is driven along a semirigid ramp member 220 secured to the lower drive tape actuator arm 225 to force said arm in a counterclockwise direction (FIG. 6) to cause the scanning mirror 23 to be oscillated in synchronism with the xerographic drum 1 by means of the drive connection link, lower tape 252, between controller 200 and the wheel segment 104 driven through motor shaft of MOT–3.

When the drive connection to the object or scanning mirror 23 is provided through lower tape 252, the mirror is oscillated at a greater angular velocity than that of the xerographic drum and through a greater arc than in the 1:1 copy mode of operation resulting in a greater area of the platen 22 being scanned to project an image of the original document through lens 24 onto the xerographic drum at a size reduced from the original document. To achieve this increased speed of scan, the radius from the center of shaft 101 is lesser to the securing portion of lower drive tape actuator arm 225 than the radius from the center of rotation to the securing portion of wheel sector 104 thereby allowing the sector or arm 104 to drive lower drive tape actuator arm 225 at a greater a angular velocity. Due to the scanning operation of the optical system disclosed herein, if the speed of the scan was not changed in relationship to the rotation of the xerographic drum but the original document merely reduced by a lens, an elongated distorted image would be produced with only the dimension X parallel to the axis of drum rotation (shown in FIG. 2) being reduced and the dimension of the original document perpendicular to the axis of rotation being distorted Y. Therefore, to obtain an undistorted image of the original document at any magnification other than 1:1, or approximations thereof which are undiscernible to a machine operator, the speed of scan must be varied in relationship to the change in magnification that is, for example, the image placed on the photoreceptive surface at an increased rate of speed as by oscillating the scanning mirror 23 at an angular velocity greater than that of the xerographic drum 1. This increased speed of image placement results in decreasing the optical image produced on the xerographic drum in the Y-direction, and the change in position of the lens unit 24 (as disclosed in copending application "Magnification Change Apparatus," Ser. No. 607,409, filed Dec. 31, 1966, in the name of J. D. Rees, Jr.) optically reduces the image in the X-direction resulting in the formation of a facsimile of the original document.

To form the drive connection to the scanning mirror 23 through lower drive tape 252, the tape (252) is longer than the upper drive tape 251 to allow the controller drive through tape 251 to be overridden by the engagement of lower drive tape actuator arm 225 tensioning the lower drive tape 252 to thereby oscillate scanning mirror 23. The drive tape is secured to lower drive tape actuator arm 225 by means of a threaded stud-engaging a hole in the tape and secured thereto as by a suitable lock nut, and the upper drive tape 251 is similarly secured to frame plate 203. The scanning of a greater are of the platen surface at an increased speed, and changing the lens 24 to reduce the size of the optical image projected onto the drum surface as disclosed in the above-mentioned copending application, permits large size computer printout to be reproduced in standardized format.

When it is desired to produce a 1:1 copy of the original document, for example, when the individual sheets of original printout are 8½×11 inches or less, the pneumatic cylinder 210 is deactivated allowing the plunger 211 to move to its lowermost of the two physically discrete positions thereby allowing spring 105 secured at one end to optical frame 13 and at its other end to the end opposite roller 209 of bellcrank arm 206, to move the bellcrank 205 in a counterclockwise direction (FIG. 6). Rotation of the bellcrank 205 rotates actuator arm 208 in the same direction to allow lower drive tape actuator arm 225, normally biased into an opening between frame members 202 and 203, to be rotated in a clockwise direction by means of the biasing action of spring 226 thereby releasing the tension on drive tape 252 and coupling the synchronous drive connection of the object or scanning mirror 23 with the xerographic drum 1 by means of the upper drive tape 251. When the upper tape 251 is forming the synchronous driving connecting link between the scanning mirror 23 and the xerographic drum 1, the platen 22 is scanned over a lesser area and at the same angular velocity as the xerographic drum due to the scanning mirror being oscillated through an arc described by the movement of the wheel sector 104 (due to the radius from shaft 101 to the retaining position of tape 251 being the same as the radius from shaft 141 to the retainer of wheel sector 104). With upper driving tape 251 controlling the length and speed of the oscillation arc of scanning mirror 23 the area scanned is decreased (as compared to the arc described when tape 252 forms the driving connection) and the lens assembly 24 positioned (as disclosed in the aforementioned copending Rees, Jr. application) to project an essentially equidimensional optical reproduction of the original document onto the xerographic drum 1. In this mode of operation the printout from EDP equipment which is 8½×11 inches or less may be positioned on the platen and a standardized reproduction projected onto the xerographic drum surface for subsequent transfer to a support material.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Apparatus for scanning a document and projecting various size images of the document onto a moving image-receiving surface including support means for maintaining a document in a stationary position, lighting means for illuminating a document on said support means, a movable member having an image-receiving surface supported in an optical path emanating from an illuminated document positioned on said support means and terminating at said image-receiving surface, a scanning mirror positioned to sweep an optical image of a document positioned on said support means across said image-receiving surface to form a facsimile image of the document on said image-receiving surface, a lens interposed in said optical path to project various size images of the document to said image-receiving surface, and means to vary the scanning speed at a rate determined by the size of the image to be projected onto said image-receiving surface such that an undistorted facsimile of the document is projected onto said surface.

2. Apparatus for scanning a document and projecting various size images of the document onto a moving photoreceptive surface including support means for maintaining a document in a stationary position, lighting means for illuminating a document on said support means, a movable member having a photoreceptive surface for selectively retaining distributed electrical charges thereon supported in an optical path emanating from an illuminated document on said support means and terminating at said photoreceptive surface, an oscillable scanning mirror positioned to sweep an image of an illuminated document on said support means onto said photoreceptive surface to form an electrical charge facsimile image of the document on said photoreceptive surface, a lens interposed in said optical path to project various size images of a document to said photoreceptive surface, and drive means for varying the oscillation speed of said scanning mirror at a rate determined by the size of the image to be projected onto said photoreceptive surface for creating an undistorted facsimile of the document thereon.

3. The apparatus of claim 2 wherein said drive means includes a plurality of drive members operatively connected to said scanning mirror and said movable photoreceptive member to form a driving coupling therebetween, selectively actuable to vary the speed of the oscillation arc of said scanning mirror in relation to the movement of said photoreceptive member to effect a variable speed scanning of an illuminated document on said support means.

4. The apparatus of claim 3 including a a cam coupled to said movable photoreceptive member for rotation thereby and having a follower arm operatively connected thereto, said follower arm being operatively connected to said plurality of drive members for oscillating said scanning mirror.

5. The apparatus of claim 2 including control means operatively connected to said oscillable scanning mirror drive means for selectively activating one of a plurality of drive members to vary the speed of the oscillation arc of said scanning mirror.

6. The apparatus of claim 5 wherein said control means includes a plurality of concentric sectors selectively actuable to actuate one of a plurality of drive members to effect a variation in the speed and length of the oscillation arc of said scanning mirror in relation to the radius of said sector.

7. The apparatus of claim 6 wherein each of a plurality of drive members is secured to one of a plurality of concentric sectors operatively connected to said oscillable scanning mirror to effect a variation in the speed and length of the oscillation arc defined by the radius of said concentric sectors.

8. Apparatus for scanning a document and projecting various size images of the document onto a moving image-receiving surface, said apparatus comprising:

means for supporting a document to be copied in a fixed position;

means for illuminating the document on said supporting means;

a movable member having an image-receiving surface supported in an optical path extending between an illuminated document and said image-receiving surface;

means including a lens in said optical path for selectively effecting projection of various size images of the document to said imaging surface;

said means including a lens comprising means for scanning a document a line at a time at various speeds relative to the speed of said image-receiving surface in accordance with the size of the image projected by said lens;

said scanning means comprising an object mirror adapted for oscillatory movement relative to said support means; and said means for scanning a document at various speeds comprising a plurality of drive members operatively connected to said scanning mirror and said movable member to form a driving coupling therebetween, selectively actuable to vary the speed of the oscillation of said scanning mirror in relation to the movement of said movable member to effect variable speed scanning of the illuminated document on said support means.

9. Structure as specified in claim 8 including, a cam coupled to said movable member for rotation thereby and having a follower operatively connected thereto, said follower arm being operatively connected to said plurality of drive members for oscillating said scanning mirror.

10. Structure as specified in claim 8 including, control means operatively connected to said scanning mirror for selectively activating one of said drive members to vary the speed of the oscillation of said scanning mirror.

11. Structure as specified in claim 10 wherein, said control means includes a plurality of concentric sectors selectively actuable to actuate one of a plurality of drive members to reflect a variation in the speed and length of the oscillation arc of said scanning mirror in relation to a radius of said sector.

12. Structure as specified in claim 11 wherein, each of a plurality of drive members is secured to one of a plurality of concentric sectors operatively connected to said oscillable scanning mirror to effect a variation in the speed and length of the oscillation arc defined by the radius of said concentric sectors.

* * * * *